(12) United States Patent
Mabe

(10) Patent No.: US 8,967,640 B2
(45) Date of Patent: Mar. 3, 2015

(54) WHEEL ATTACHMENT

(71) Applicant: Michael John Mabe, Galveston, TX (US)

(72) Inventor: Michael John Mabe, Galveston, TX (US)

(*) Notice: Subject to any disclaimer, the term of this patent is extended or adjusted under 35 U.S.C. 154(b) by 0 days.

(21) Appl. No.: 14/149,699

(22) Filed: Jan. 7, 2014

(65) Prior Publication Data

US 2014/0191484 A1 Jul. 10, 2014

Related U.S. Application Data

(60) Provisional application No. 61/750,334, filed on Jan. 8, 2013.

(51) Int. Cl.
*B62D 61/12* (2006.01)
*B62B 5/00* (2006.01)
*B62M 6/00* (2010.01)

(52) U.S. Cl.
CPC . *B62D 61/12* (2013.01); *B62B 5/00* (2013.01); *B62M 6/00* (2013.01)
USPC ..................................... 280/86.5; 280/43.17

(58) Field of Classification Search
USPC ................. 280/86.5, 43, 43.17, 43.2, 43.23
See application file for complete search history.

(56) References Cited

U.S. PATENT DOCUMENTS

| | | | | |
|---|---|---|---|---|
| 3,315,974 | A * | 4/1967 | Weaver, Jr. et al. | 280/43.2 |
| 5,291,959 | A * | 3/1994 | Malblanc | 180/11 |
| 6,572,124 | B2 * | 6/2003 | Mlsna et al. | 280/86.5 |
| 6,604,734 | B1 * | 8/2003 | Griffiths | 267/64.14 |
| 6,752,406 | B2 * | 6/2004 | Pierce et al. | 280/86.5 |
| 6,772,850 | B1 * | 8/2004 | Waters et al. | 180/65.51 |
| 6,902,177 | B2 * | 6/2005 | Lindsay et al. | 280/282 |
| 7,559,400 | B2 * | 7/2009 | Smith | 180/291 |
| 7,931,285 | B2 * | 4/2011 | Pompa et al. | 280/86.5 |

* cited by examiner

*Primary Examiner* — Drew Brown
(74) *Attorney, Agent, or Firm* — Scott D. Compton; The Compton Law Firm, P.C.

(57) ABSTRACT

An apparatus for adding a propulsion wheel to a land based vehicle. When the apparatus is attached to a land based vehicle the apparatus is operationally configured to bias a propulsion wheel attached thereto to a position of engagement with a travel surface supporting the land based vehicle thereon.

13 Claims, 8 Drawing Sheets

WHEEL ATTACHMENT

CROSS-REFERENCE TO RELATED APPLICATIONS

This patent application claims the benefit of U.S. provisional patent application Ser. No. 61/750,334 filed Jan. 8, 2013.

STATEMENT REGARDING FEDERALLY SPONSORED RESEARCH OR DEVELOPMENT

Not applicable.

FIELD OF THE APPLICATION

The application relates generally to the addition of an extra or supplementary wheel to a land based vehicle for propulsion assistance and/or vehicle stability.

BACKGROUND

Basic propulsion assists for human-powered vehicles such as bicycles, tricycles, quadricycles and the like have been contemplated. In one known approach, a hub assembly on one or more of the wheels of a vehicle is replaced with a motor. In another approach, an extra wheel is attached to a particular vehicle via a static connector whereby the additional wheel is powered independently from the vehicle drivetrain. In both instances, the assist is meant to help propel the vehicle with less effort, hence the term "assist."

In certain instances, it is not practical to use motors in place of hub assemblies on certain vehicles because some vehicles are not readily convertible from solely human-powered to propulsion-assisted. In other instances, because of the physical makeup of the wheel and/or vehicle, hub assemblies cannot be replaced with motors. Moreover, assists are not always required or desired for certain vehicular usage. When not being used, a hub based assist may increase the vehicular load by actually increasing the weight of the vehicle. In addition, use of an additional wheel attached to a vehicle may increase the rolling resistance of the vehicle.

A wheel attachment is needed that overcomes the above shortcomings.

SUMMARY

The present application is directed to an apparatus for adding a propulsion wheel to a land based vehicle effective to move across a travel surface, when attached to the land based vehicle the apparatus is operationally configured to bias a propulsion wheel attached to the apparatus in an engagement position with the travel surface.

The present application is also directed to an apparatus for adding a propulsion wheel to a land based vehicle effective to move across a travel surface, when attached to the land based vehicle the apparatus is operationally configured to adjust the amount of bias applied by a propulsion wheel attached to the apparatus against the travel surface.

The present application is also directed to a method of biasing a propulsion wheel against a travel surface of a land based vehicle, the method comprising the following steps: (1) attaching to a land based vehicle an apparatus and propulsion wheel rotatably attached thereto, the apparatus having a biasing member for pivoting at least part of the apparatus about the land based vehicle in a manner effective to direct the propulsion wheel between one or more engagement positions and one or more disengagement positions with the travel surface; and (2) directing the propulsion wheel to a first biased position against the travel surface.

BRIEF DESCRIPTION

Figure 1:
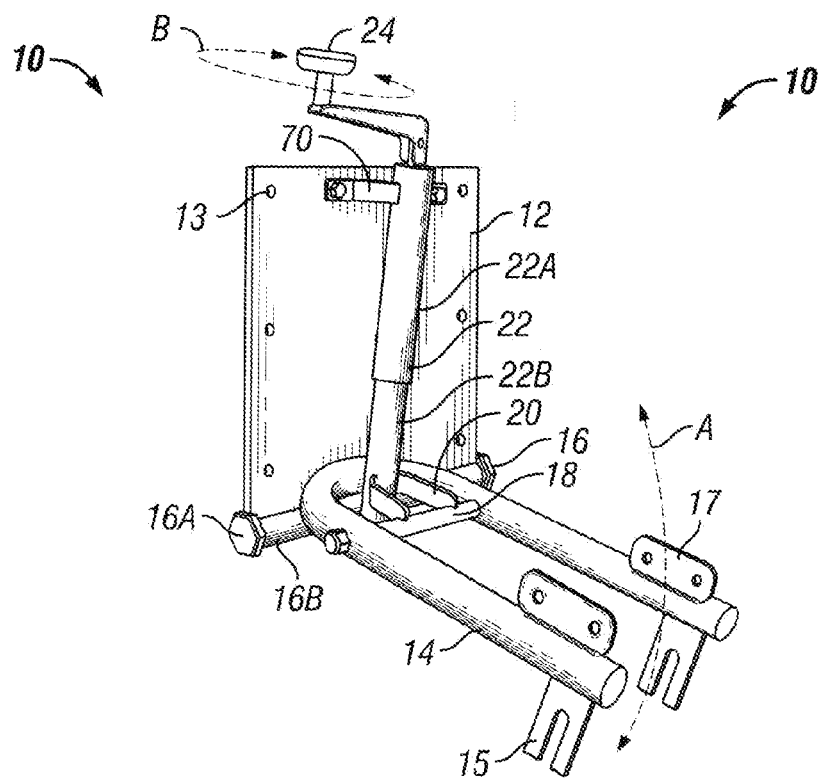
FIG. 1 is a perspective view of a simplified embodiment of the apparatus of this application.

It has been discovered that an attachment apparatus for bearing a wheel may be employed that overcomes the above mentioned shortcomings. Heretofore, such a desirable achievement has not been considered possible, and accordingly, the apparatus, system and method of this application measure up to the dignity of patentability and therefore represent a patentable concept.

Before describing the invention in detail, it is to be understood that the present apparatus, system and method are not limited to particular embodiments. It is also to be understood that the terminology used herein is for the purpose of describing particular embodiments only, and is not intended to be limiting. As used in this specification and the appended claims, the term "land based vehicle" refers to a device operationally configured for transport across a travel surface including, but not limited to a device for carrying and/or transporting persons, animals and things across a travel surface. The terms "surface," "support surface," and "travel surface" may be used interchangeably to refer to any surface upon which a particular land based vehicle may be set in motion. Surfaces may be planar, non-planar, and may also include rail transport, i.e., tracks. The phrase "propulsion wheel" may refer to a wheel having an in-wheel motor or a wheel driven by an external motor such as a chain driven wheel. In addition, the term "wheel" may refer to a wheel and tire assembly as understood by persons of ordinary skill in the art of motor driven and pedal cycles. Herein, a propulsion wheel may be described as "engaging" a travel surface when the wheel applies enough force to the travel surface to create traction between the wheel and the travel surface when the wheel is rotating, i.e., the corresponding vehicle is moving. In one implementation, "engaging" may include the force of gravity or weight of the wheel and the apparatus upon a particular travel surface. In another implementation, "engaging" may include a wheel applying a force to the support surface greater than the force of gravity. In still another implementation, "engaging" may include a propulsion wheel applying a force to the travel surface that is less than the force of gravity. The term "surrey" is a generic term understood by persons of ordinary skill in the art of cycles that refers to a class of multi-wheel pedal powered vehicular cycles available from commercial sources including, but not necessarily limited to International Surrey Company Ltd., of La Marque, Tex., having an internet address at the time of filing of this application of http://www.surreycompany.com and Ciclofan di Benvenuti Alessandro SNC, of Saludecio (RN), Italy, having an internet address at the time of filing of this application of http://www.ciclofan.com.

In one aspect, the application provides an apparatus operationally configured to attach one or more wheels to a pre-existing land based vehicle. Herein, the apparatus may be built to scale. Suitably, the apparatus is operationally configured to bias the one or more wheels attached thereto against a travel surface supporting the land based vehicle and vice versa.

In another aspect, the application provides an apparatus operationally configured to receive one or more wheels in attachment thereto, the apparatus being operationally configured to attach one or more wheels to a vehicle of known construction, such as a vehicle manufactured to include (1) a preset number of wheels and/or (2) continuous tracks, also referred to herein as tank treads. Thus, the apparatus is operationally configured to add one or more additional operable wheels, such as a propulsion wheel, to an already wheeled and movable vehicle or one or more operable wheels to a vehicle having continuous tracks.

In another aspect, the application provides an apparatus operationally configured to attach one or more additional wheels to a land based vehicle including, but not necessarily limited to carriages, cycles, carts, automobiles, buggies, sleds, and other devices typically operated on travel surfaces including, but not necessarily limited to solid surfaces, sand, mud, dirt, rocks, snow, ice, and combinations thereof. It is therefore contemplated that the type of wheel to be attached to the apparatus may vary depending on the type of terrain or terrains that the land based vehicle is to travel over. In addition, the land based vehicle may be human-powered or motorized.

In another aspect, the application provides an apparatus operationally configured to attach at least one additional propulsion wheel to a land based vehicle. The propulsion wheel may include an electronically powered hub wheel, or be driven using a hydrocarbon based energy source including but not necessarily limited to gasoline, propane and butane. The apparatus may also be operationally configured to secure a power source for the propulsion wheel to a land based vehicle.

In another aspect, the application provides an apparatus operationally configured to attach one or more additional wheels to any land based multi-wheel vehicle or continuous track vehicle for assisting with propelling the vehicle as desired.

In another aspect, the application provides an apparatus operationally configured to attach one or more additional rotatable wheels to a land based vehicle. The apparatus is further operationally configured to direct the one or more wheels from a first disengagement position apart from the travel surface to a second engagement position with a travel surface and vice versa.

In another aspect, the application provides an apparatus operationally configured to attach one or more additional wheels to a land based vehicle and direct the one or more wheels up and down causing the one or more wheels to engage or disengage a travel surface of the vehicle as desired.

In another aspect, the application provides an apparatus operationally configured to attach an additional wheel to a pedal powered land based vehicle.

In another aspect, the application provides an apparatus operationally configured to attach an additional wheel to a pedal powered surrey.

In another aspect, the application provides an apparatus for attaching a wheel to a land based vehicle, the apparatus being operationally configured to pivot, swing or otherwise direct the wheel up and down when the apparatus is attached to a target vehicle.

In another aspect, the application provides an apparatus for attaching a wheel to a land based vehicle, the apparatus being operationally configured to direct the wheel between an engagement position with a travel surface and disengagement position with a travel surface.

In another aspect, the application provides an apparatus for attaching a wheel to a land based vehicle, the apparatus being operationally configured to rotate the wheel in a manner effective whereby the wheel may engage a travel surface and disengage a travel surface.

In another aspect, the application provides an apparatus for attaching a wheel to a land based vehicle, the apparatus being operationally configured to apply linear force to a travel surface and the vehicle simultaneously.

In another aspect, the application provides an apparatus for attaching a wheel to a land based vehicle, the apparatus being operationally configured to lift at least part of the vehicle off of the travel surface.

In another aspect, the application provides an apparatus for attaching a wheel to a land based vehicle, the apparatus being releasably attachable to the vehicle.

In another aspect, the application provides an apparatus for attaching a wheel to a land based vehicle, the apparatus being operationally configured for use with one or more types of vehicles.

In another aspect, the application provides an apparatus for attaching a wheel to a land based vehicle having two rear wheels, the apparatus being attached to the vehicle at a point between the two rear wheels.

In another aspect, the application provides an apparatus for attaching a wheel to a land based vehicle. In one embodiment, the apparatus includes a width less than the width of the land based vehicle. In another embodiment, the apparatus includes a width substantially similar as the width of the land based vehicle. In another embodiment, the apparatus includes a width greater than the width of the land based vehicle.

DISCUSSION

To better understand the novelty of the apparatus, system, and method of use thereof, reference is hereafter made to the accompanying drawings, wherein like reference numerals are used for like features throughout the several views. It is to be fully recognized that the different teachings of the embodiments disclosed herein may be employed separately or in any suitable combination to produce desired results.

With reference to FIG. 1, a simplified embodiment of the apparatus 10 is provided. As shown, in this embodiment the apparatus 10 includes a first part or section 12 operationally configured to attach or releasably attach to a land based vehicle (hereafter "vehicle") and a second part or section 14 operationally configured to receive a wheel, including but not necessarily limited to a propulsion wheel, in permanent or releasable attachment thereto. Without limiting the invention, the first section 12 may be releasably attached to a target vehicle, or part of a target vehicle, as desired. In this embodiment, the first section 12 includes a substantially planar base member including apertures 13 for receiving fasteners there through. Suitable fasteners include, but are not necessarily limited to screws, nails, rivets, bolts, and combinations thereof. In operation, the first section 12 of this embodiment suitably abuts a substantially planar surface of a vehicle or abuts at least part of a vehicle surface as desired. Also, aperture placement, aperture size and the total number of apertures may vary as desired.

In other embodiments, the configuration of the first section 12 may vary as necessary to engage a specific section, surface or part of a particular vehicle. For example, the first section 12 may include hooks for releasable attachment to a target vehicle. In another example, the first section 12 may be strapped or tied to a target vehicle. In yet another embodiment, the first section 12 may include a male type member for releasable attachment with a female type member of a target vehicle or vice versa. It is further contemplated that the apparatus 10 may be welded, glued, or otherwise adhered to a target vehicle as desired. Other modes of attaching an apparatus 10 are herein contemplated including those further discussed below.

Still referring to FIG. 1, a suitable second section 14 may include a wheel stay operationally configured to receive a wheel in attachment thereto. As shown, a suitable wheel stay is provided in the form of two legs or forks comprising wheel drop outs 15 as these terms are understood by persons of ordinary skill in the art of cycles. Also, the second section 14 may include mounting brackets 17 for fender attachment, storage compartment attachment, motor or engine attachment or attachment of other objects as desired. Suitably, the second section 14 of FIG. 1 is operationally configured to receive a single wheel, however, it is contemplated that the second section 14 may be operationally configured to receive a plurality of wheels as desired.

As shown, the second section 14 may be pivotally connected to the first section 12 via a first pivot member 16 and/or another part of the apparatus 10 as desired. Without limiting the invention to a particular mode of operation, one suitable first pivot member 16 includes a pivot axle 16A operationally configured to allow the second section 14 to pivot about the first section 12 during operation. A suitable pivot axle 16A may include a solid, semi-solid or tubular rod type member composed of one or more steels, alloys, composite materials, woods, and combinations thereof. The pivot axle suitably rotates within one or more pivot sleeves 16B affixed to first section 12, the pivot sleeves 16B being operationally configured to stabilize the pivot axle 16A in relation to first and second sections 12, 14. Without limiting the invention to a particular embodiment, the second section 14 is suitably affixed to the pivot axle 16A via welds, glue, epoxy, bolts or other modes of attachment effective for the second section 14 to pivot about the pivot axle 16A during operation. In another embodiment, the second section 14 and pivot axle 16A may include a one piece construction.

With continued reference to FIG. 1, the apparatus 10 suitably includes a biasing member in communication with the second section 14. The biasing member is suitably operationally configured to dictate pivot action of the second section 14. Thus, the biasing member is operationally configured dictate biasing of a wheel attached to the second section 14 against a travel surface supporting a vehicle thereon. One suitable biasing member, or actuation control member (hereafter "actuator 22") includes an outer member 22A and an inner member 22B, the inner member 22B being operationally configured to telescopically travel within the outer member 22A a distance according to the action of the actuator shaft, which is provided as an internal screw thread located longitudinally within the actuator 22. As understood by persons of ordinary skill in the art of lifting equipment, a suitable actuator 22 may include a spin lift or telescopic jackscrew or worm gear screw jack as understood by the skilled artisan operationally configured to dictate pivot action of the second section 14. For example, the actuator 22 may include a handle 24 for rotating the actuator shaft (in a circular manner according to Arrow "B") to apply an amount of linear force necessary to direct the second section 14 directionally along an arc as shown for exemplary purposes according to Arrow "A." As shown, the actuator 22 may be attached to the first section 12 via one or more interconnects 70 of a predetermined length affecting the orientation of the actuator 22. It is also contemplated that in another embodiment the actuator 22 may include a pneumatic actuator. In still another embodiment, the actuator 22 may include a linear actuator. In still another embodiment, the actuator 22 may include a biased actuator including but not necessarily limited to a spring loaded actuator. Suitably, an actuator 22 of this application is operationally configured to bias a propulsion wheel attached to the apparatus 10 in one or more engagement positions with the travel surface in a manner effective for the propulsion wheel to gain traction and provide propulsion assist to the vehicle. For example, in an embodiment where a propulsion wheel including an inflatable tire is attached to the apparatus 10, once the tire contacts the travel surface and as the second section 14 continues to draws nearer the travel surface the pressure within the tire causes the tire to widen near the travel surface, or otherwise deform from its original resting shape. In one non-limiting example, in order to provide sufficient friction for the tire of a propulsion wheel with a travel surface over time, the amount of bias applied by the tire to the travel surface may need to be increased as the tread on the tire wears down over time. In addition, an actuator 22 of this application is operationally configured to direct a propulsion wheel attached to the apparatus 10 between one or more engagement positions with a travel surface and one or more disengagement positions apart from a travel surface of a vehicle.

Figure 2:
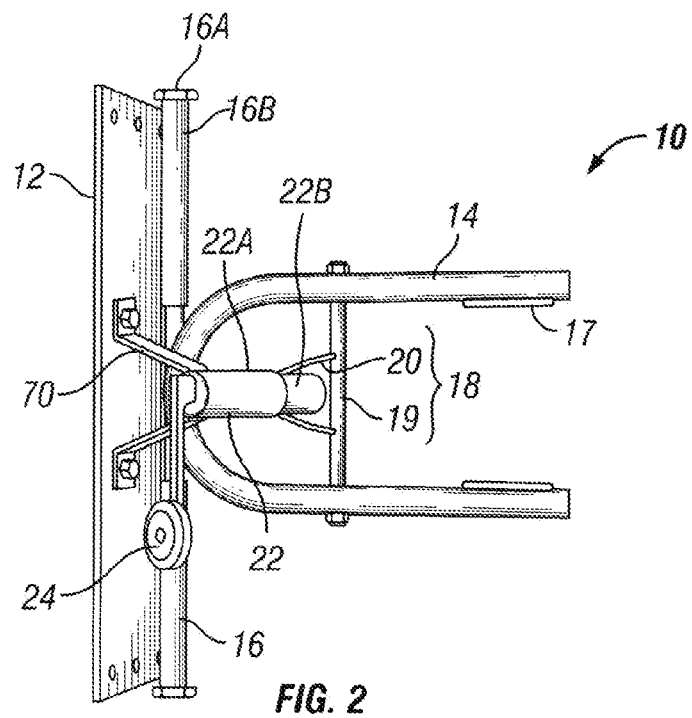
FIG. 2 is a top view of the apparatus of FIG. 1.
Figure 3:
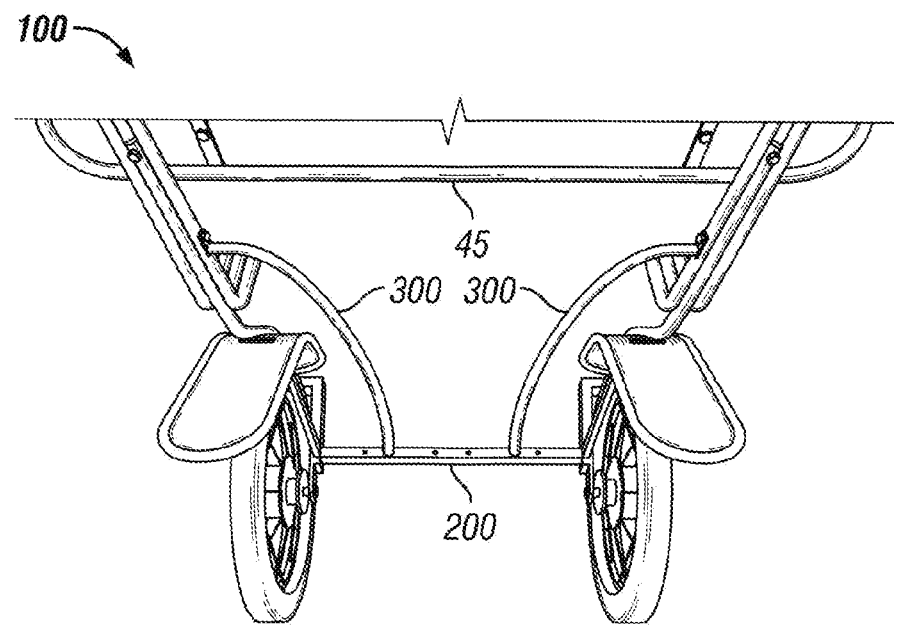
FIG. 3 is a simplified view of the rear of a surrey.

Turning to FIG. 2, the apparatus 10 suitably includes a second pivot member 18 operationally configured to work in conjunction with the actuator 22 for pivoting the second section 14. As shown, a suitable second pivot member 18 includes a pivot axle 19 and a directional connect member 20 attached thereto, the pivot axle 19 and directional connect member 20 being disposed between the forks of the second section 14 as shown. In this embodiment, the directional connect member 20 is connected to the inner member 22B via dual attachment members connected to opposing sides of the inner member 22B. In another embodiment, the directional connect member 20 may be a single attachment member, or three or more separate attachment members as desired. According to the points of attachment of the directional connect member 20, telescopic travel of the inner member 22B suitably pushes and/or pulls the directional connect member 20 in a manner effective to pivot about the pivot axle 19 thereby promoting the pivot action of the second section 14 up to about 50.0 degrees (see Arrow "A") relative to the first pivot member 16.

With attention now to FIGS. 3-8, one simplified embodiment of an apparatus 10 operationally configured for use with a surrey 100 is discussed. Although surrey frame construction may vary amongst manufacturers, most surreys 100 share various structural features that may be targeted for attachment of the apparatus 10. For example, the rear end of most surreys 100 (FIG. 3) include at least an exposed horizontal base frame 200 and substantially vertical type frame stays 300 in attachment thereto. Although it is contemplated that the apparatus 10 may be releasably attached to other parts or areas of a surrey 100, the apparatus 10 of FIGS. 4-8 is operationally configured for releasable attachment to a surrey 100 base frame 200 and frame stays 300 as shown in the simplified illustration of FIG. 3.

Figure 4:
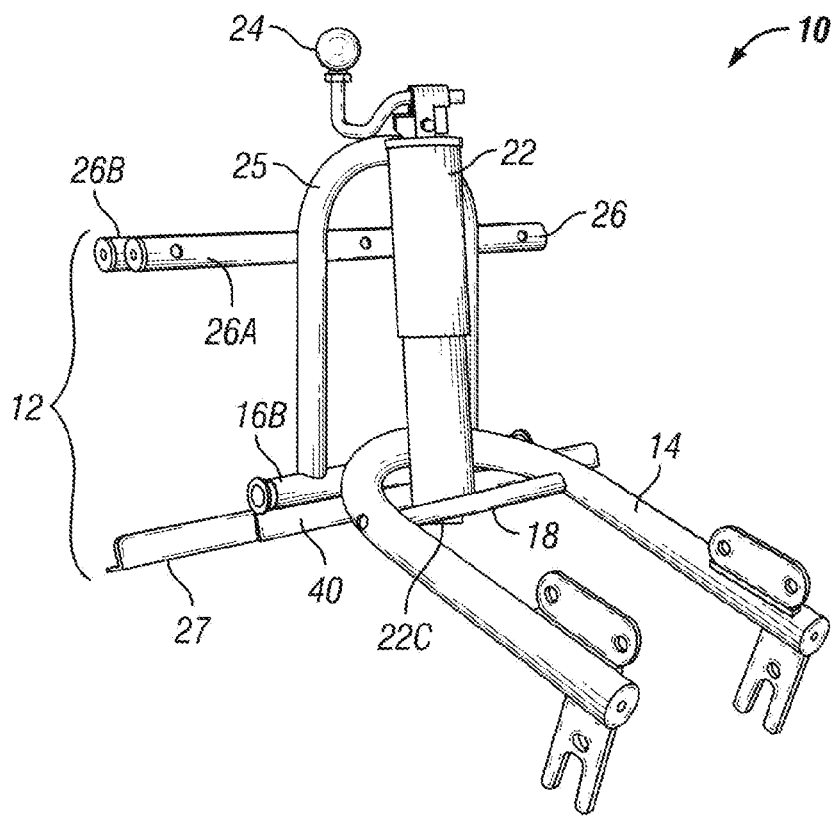
FIG. 4 is a front perspective view of another simplified embodiment of the apparatus of this application.

As shown in FIG. 4, the first section 12 of this embodiment suitably includes (1) a main frame 25, (2) a first attachment member 26 (including a first member 26A and a second member 26B) for securing to frame stays 300 of a surrey 100, (3) a second attachment member 27 for securing to a base frame 200 of a surrey 100 and (4) a first pivot member 16. The second section 14, second pivot member 18, actuator 22 and handle 24 of this embodiment operate in a similar manner as discussed with reference to FIGS. 1 and 2, although other configurations may be employed as desired.

As FIG. 4 illustrates, the main frame 25 is suitably attached to (1) the actuator 22, (2) the first member 26A and (3) the pivot sleeves 16B. The first attachment member 26 and the second attachment member 27 operate at each end of main frame 25 to stabilize the apparatus 10 along various points of the base frame 200 and frame stays 300 during operation. Stabilization is desired for preventing, minimizing or otherwise lessening surrey 100 vibration and frame stress created by wheel motor torque and/or other forces acting on the apparatus 10 during operation.

Figure 5:
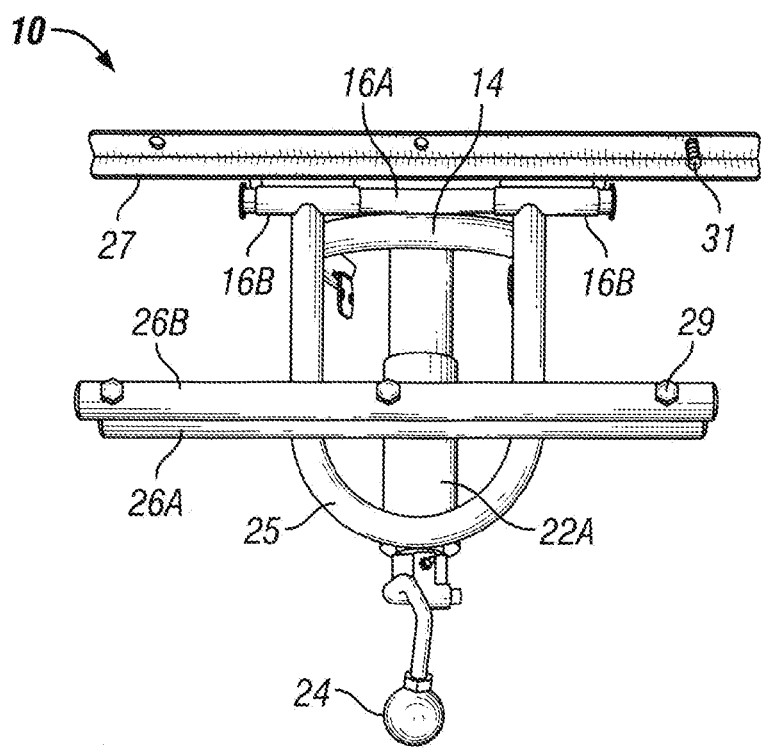
FIG. 5 is a perspective back view of the apparatus of FIG. 4.

Turning to FIG. 5, the main frame 25 of this embodiment includes a non-linear member, e.g., a U-shape tubular type member, defined by (1) two ends, (2) a curved section there between, (3) a first side and (4) a second side. The two ends of the main frame 25 are operationally configured to attach to the pivot sleeves 16B of the first pivot member 16. The first side of the main frame 25 is operationally configured to attach to the first member 26A and the second side of the main frame 25 is operationally configured to attach to the outer member 22A of the actuator 22. Other main frame 25 configurations are herein contemplated whereby any one configuration may be chosen for ease of manufacturing and/or cost savings.

Similar as in the embodiment of FIGS. 1 and 2, the first pivot member 16 suitably includes a pivot axle 16A disposed within the pivot sleeves 16B. As FIG. 5 depicts, the first pivot member 16 is fixed to the second attachment member 27 via the pivot sleeves 16B. As further shown, the pivot axle 16A lies partially exposed between the pivot sleeves 16B whereby part of the second section 14 is attached to the exposed portion of the pivot axle 16A. As understood by persons of ordinary skill in the art, the pivot sleeves 16B include hollow cylindrical bodies defined by a longitudinal axis for receiving a cylindrical pivot axle 16A therein.

Figure 6:
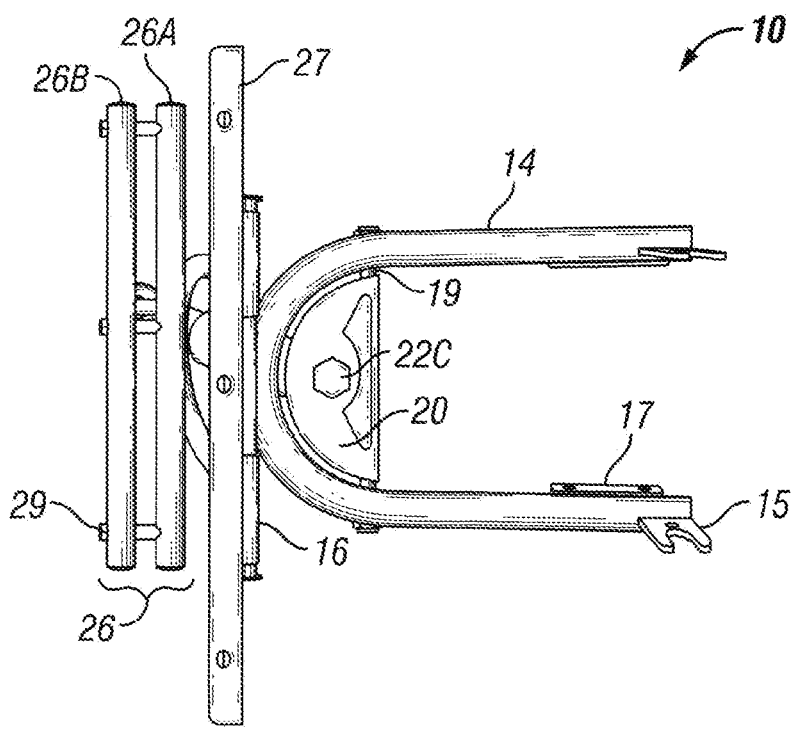
FIG. 6 is a perspective bottom view of the apparatus of FIG. 4.

Referring to FIGS. 4-6, the apparatus 10 suitably includes a second pivot member 18 operationally configured to work in conjunction with the actuator 22 for pivoting the second section 14. In this embodiment, a suitable second pivot member 18 includes a pivot axle 19 and a directional connect 20 attached thereto, the pivot axle 19 and directional connect 20 being disposed between the forks of the second section 14. The directional connect 20 is suitably connected to the inner member 22B via an actuator stop 22C (see FIGS. 4 and 6) whereby telescopic travel of the inner member 22B pushes and/or pulls the directional connect 20 in a manner effective to pivot about the pivot axle 19 thereby assisting the pivot action of the second section 14 (similar as Arrow "A" in FIG. 1) up to about 50.0 degrees. As FIG. 6 illustrates, the apparatus 10 provides a desired amount of clearance between the directional connect 20 and the second section 14, which allows the directional connect 20 to pivot about the pivot axle 19 unencumbered. In this embodiment, the directional connect 20 is a substantially planar semi-circle type member attached to the pivot axle 19, but other configurations may be employed that provide unencumbered pivot action.

Still referring to FIG. 6, the first and second members 26A, 26B may be provided as sandwiching members connected via one or more fasteners 29 including, but not necessarily limited to screws, bolts, pins, clamps, cable, rope, tape, tie wraps, and combinations thereof. In another embodiment, the first and second members 26A, 26B may be permanently affixed to the surrey 100 via welds, adhesive materials, and combinations thereof. Suitably, the first and second members 26A and 26B are operationally configured to sandwich the frame stays 300 of a surrey 100 in a manner effective to help brace the apparatus 10 during use. As one of ordinary skill in the art may appreciate, the length of the first and second members 26A and 26B and the distance there between may vary according to the design of a particular surrey 100 including the distance between the frame stays 300 and the thickness of the frame stays 300. In addition, the distance between the first attachment member 26 and the second attachment member 27, as well as the length of the main frame 25 and the length of the second section 14, may be determined according to the height of the base frame 200 from the support surface. In suitable operation, the dimensions of the apparatus 10 employed are operationally configured to direct a wheel attached to the second section 14 up and down in a manner effective to engage the travel surface during wheel rotation.

A suitable second attachment member 27 may include an L-beam type member such as angle iron and the like operationally configured to be attached to the base frame 200 via one or more fasteners 30 operationally configured to releasably attach the second attachment member 27 to the base frame 200. Suitable fasteners 30 may include, but are not necessarily limited to screws, bolts, clamps, tie wraps, tape, rope, cable, and combinations thereof. In one implementation it is contemplated that an angle iron type second attachment member 27 may abut two sides of a rectangular shaped base frame 200 providing secure and snug attachment when fastened thereto. In another embodiment, where a base frame 200 has a shape other than rectangular, the second attachment member 27 may be provided with a surface configuration effective for abutment to the surface of the base frame 200 as desired.

Figure 7:
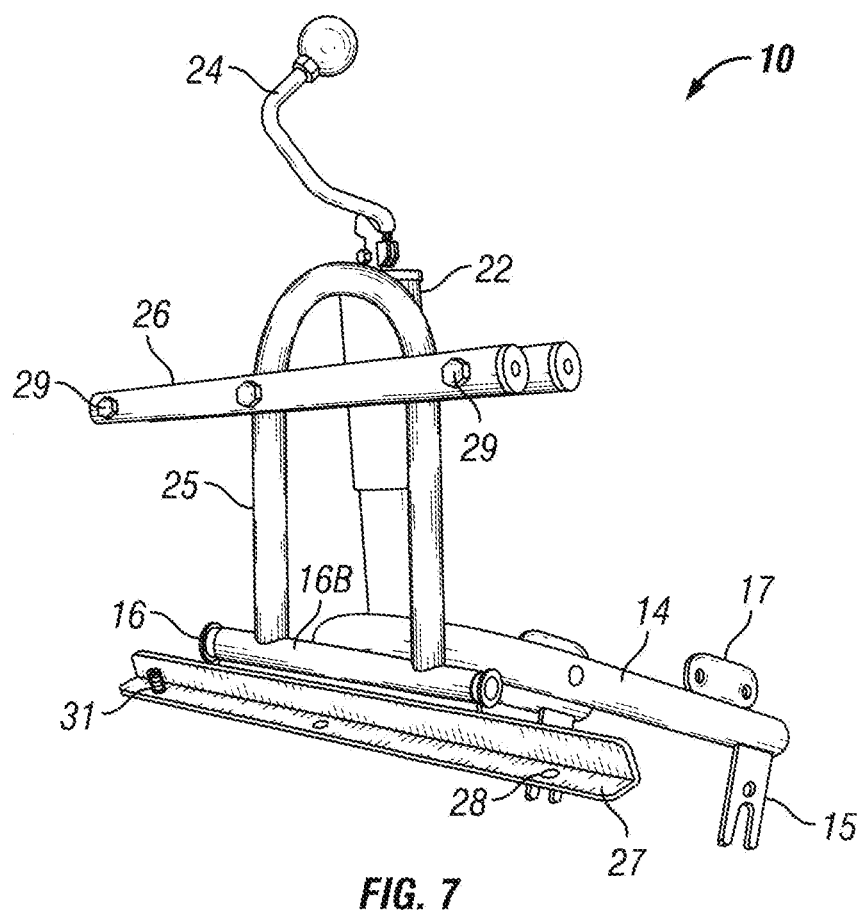
FIG. 7 is another perspective back view of the apparatus of FIG. 4.

With reference to FIG. 7, the second attachment member 27 suitably includes one or more apertures 28 there through that correspond with apertures along a target base frame 200. In the event a target base frame 200 does not include apertures, one or more apertures may be formed in the base frame 200 as may be necessary for securing the second attachment member 27 to the base frame 200.

Figure 8:
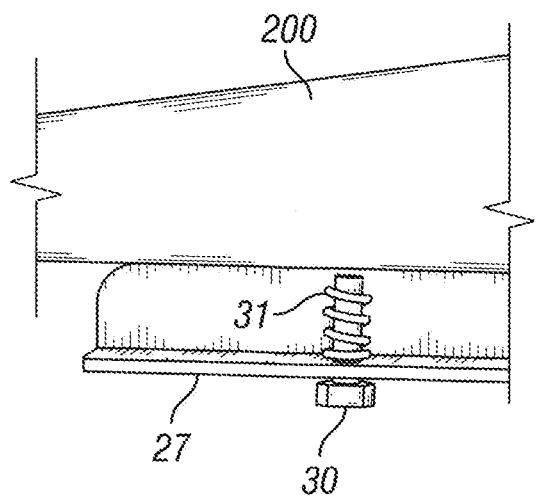
FIG. 8 is a simplified view of an embodiment of the second attachment member, resilient member, fastener and the base frame of a surrey.

The present apparatus 10 may also be provided having one or more anti-stress members or features. As shown in FIG. 8, the second attachment member 27 may be attached to the first pivot member 16 in a manner providing space between the second attachment member 27 and the base frame 200. The non-snug spacing configuration provides travel distance for the second attachment member 27, which minimizes any stress that may otherwise be transferred from the apparatus 10 to the surrey 100 during operation, e.g., jarring of the apparatus 10 during operation. As further shown in FIG. 8, one or more resilient members 31 may be employed to further minimize the amount of stress that may otherwise be transferred from the apparatus 10 to the surrey 100 during operation. In effect, the resilient members 31 operate in similar fashion to shock absorbers on other known vehicles. Suitable resilient members 31 for use with the second attachment member 27 include, but are not necessarily limited to springs, pneumatic shocks, foam, padding, rubber gaskets, and combinations thereof. A suitable spring includes a steel spring such as a percussion spring and the like surrounding a corresponding fastener 30. In an embodiment employing a percussion spring, a suitable fastener 30 may include, but is not necessarily limited to a mounting bolt.

It is further contemplated that one or more resilient members 31 may also be interspersed between fasteners 30 along the length of the second attachment member 27. In one embodiment, one or more resilient members 31 may be provided as an individual assembly piece. In another embodiment, one or more resilient members 31 may be attached to the second attachment member 27 or the base frame about the apertures in a permanent manner (see FIG. 5). In still another embodiment, resilient members 31 may be excluded altogether whereby the second attachment member 27 is welded or otherwise solidly affixed to the base frame 200.

Figure 9:
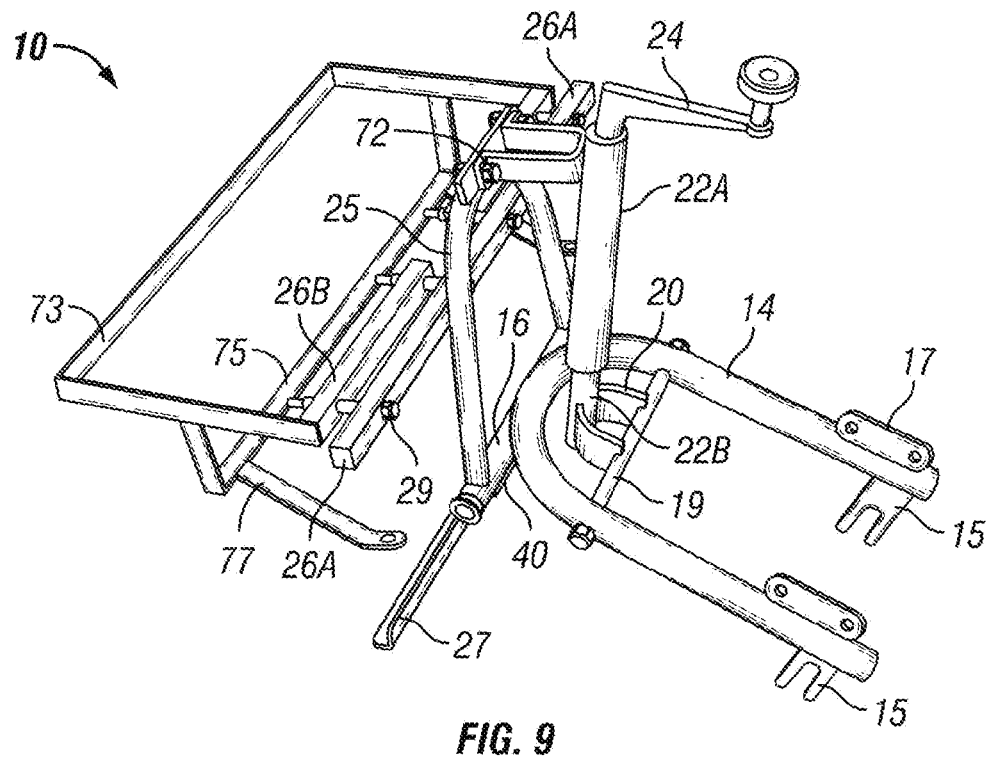
FIG. 9 is a front perspective view of another simplified embodiment of the apparatus of this application.
Figure 10:
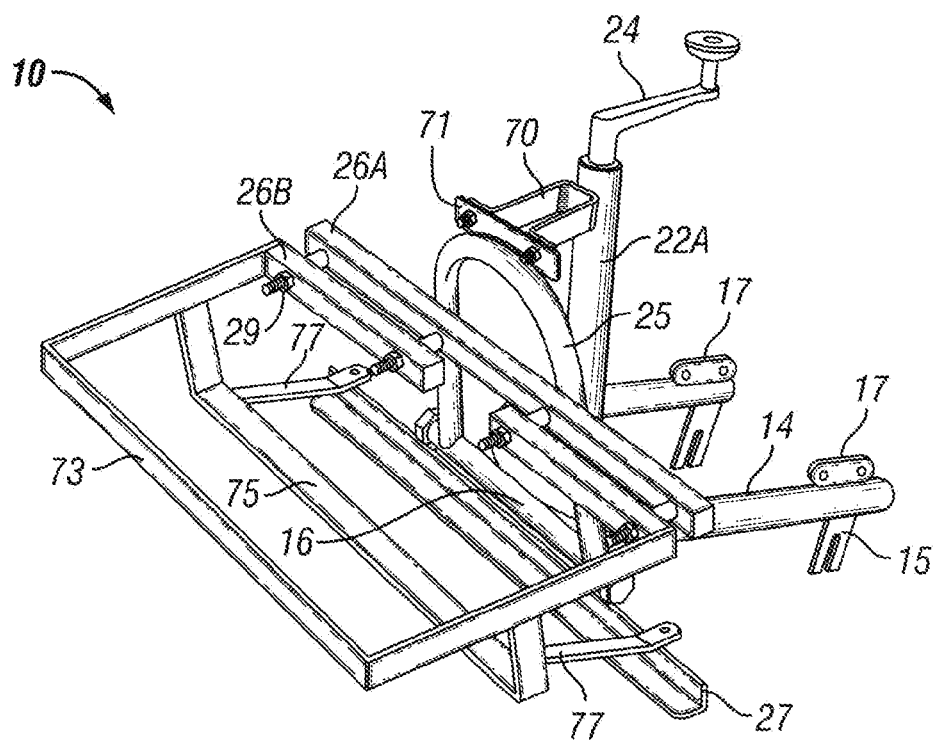
FIG. 10 is a perspective back view of the apparatus of FIG. 9.
Figure 11:
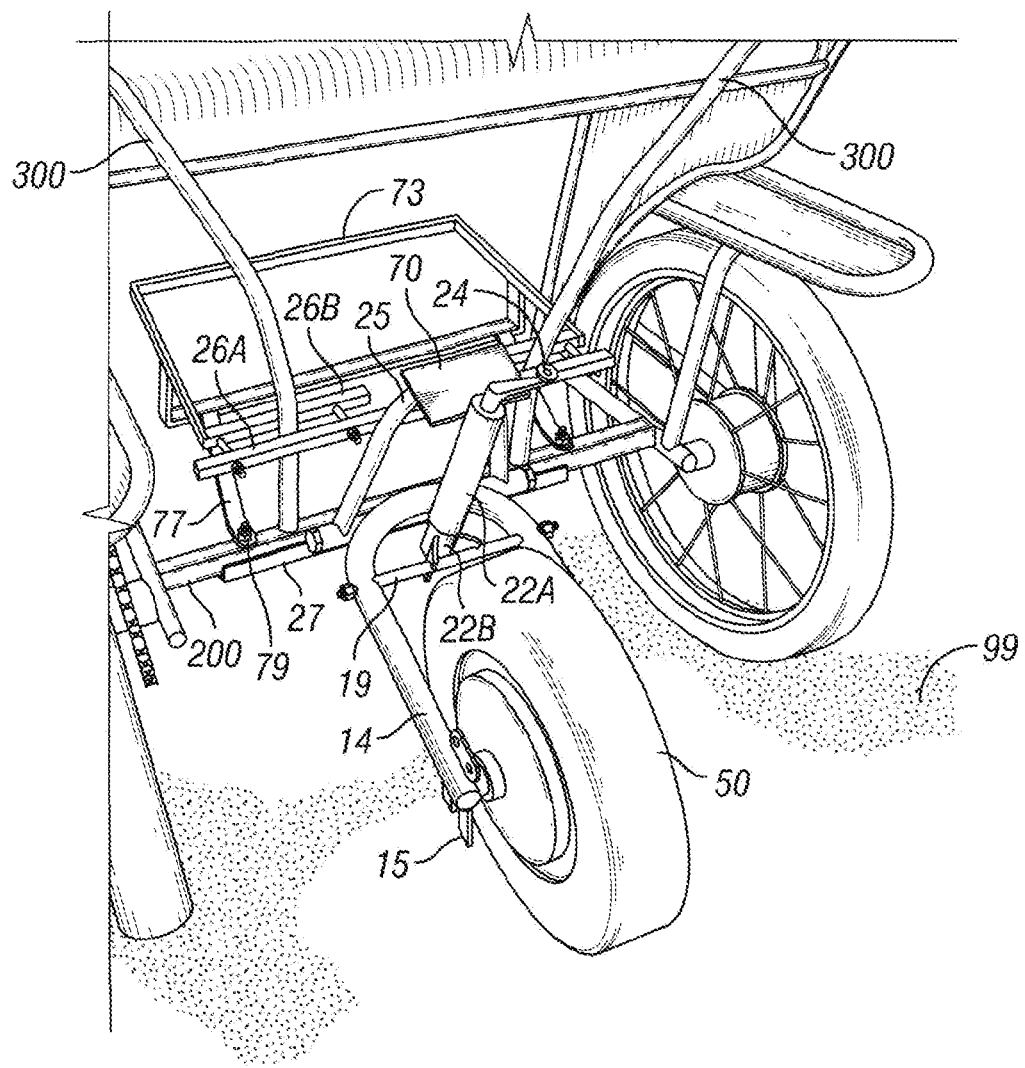
FIG. 11 is a simplified view of another embodiment of the apparatus attached to a surrey, the apparatus including a propulsion wheel attached thereto.

Another embodiment of the apparatus 10 is provided in FIGS. 9-11. In this embodiment, the actuator 22 is secured to the main frame 25 via an interconnect 70 disposed there between. Without limiting the configuration of the interconnect 70 to any particular embodiment, one suitable interconnect 70 may include a "U" type member as shown in FIGS. 9 and 10. Another suitable interconnect 70 may include a substantially planar member as shown in FIG. 11. As depicted, the interconnect 70 may be attached at the bend of the main frame 25 and at a corresponding elevational portion of the actuator 22 as shown. Although the interconnect 70 may be adhered, welded or otherwise directly affixed to the main frame 25 and actuator 22, one or more intermediary members may be employed for attachment of the interconnect 70. For example, a bracket 71 may be fixed to the main frame 25 for providing an attachment surface of the interconnect 70 via one or more fasteners 72 as shown in FIGS. 9-10. Although the length of the interconnect 70 and points of attachment to the actuator 22 and main frame 25 may vary, a suitable interconnect 70 includes a length and points of attachment for orienting the central axis of the actuator 22 in a manner effective to produce a desired pivot action of the second section 14.

Still referring to FIGS. 9-11, the apparatus 10 may include a housing member, cage or other additional member for holding, housing, supporting or otherwise securing one or more items to the surrey 100 as desired. In this embodiment, the cage includes at least a frame 73, a bottom member 75 and one or brackets 77 operationally configured to be secured to the base frame 200 of a surrey 100. In one embodiment, the cage may be operationally configured to hold, house or otherwise secure a power source such as a battery for operating a wheel attached to the apparatus 10. In another embodiment, the cage may be operationally to hold multiple items, e.g., a battery and an individual's bag, purse, carrying case, tool box, first aid kit, food and beverage items, and the like. As such, the size and shape of the frame 73 may be provided as desired. Likewise, the bottom member 75 is suitably configured to hold one or more target items in a manner effective to maintain the item(s) in the cage during operation of the apparatus 10.

Although the apparatus 10 may be constructed from one or more materials as desired, suitable materials include rugged materials operationally configured to provide wheel engagement over various surfaces and under various loads or stresses. In particular, the apparatus 10 may be constructed from materials including but not necessarily limited to those materials resistant to chipping, cracking, excessive bending and reshaping as a result of ozone, weathering, heat, moisture, other outside mechanical and chemical influences, as well as the various physical impacts. Suitable materials include, but are not necessarily limited to metals, plastics, woods, fiberglass, filled composite materials, and combinations thereof. Suitable materials of construction may include ferrous and nonferrous metals, composite materials, plastics, and combinations thereof. Suitable metals include, but are not necessarily limited to steel, stainless steel, aluminum, and alloys and amalgams of such. In embodiments of the apparatus 10 using metal parts, the various parts may be secured for structural support via welds, adhesive materials, fasteners, and combinations thereof. In an embodiment using welds, additional pieces or fittings may be welded between various parts of the apparatus 10 to enhance structural strength as desired. As an example, a planar type member 40, e.g., flat stock, (see FIG. 4) may be welded to the first pivot member 16 to serve as a substrate for welding the second attachment member 27.

With attention to FIG. 11, one suitable embodiment of the apparatus 10 is shown in operable attachment to a surrey 100 including a wheel 50 attached thereto. In one implementation, the wheel 50 may include a free spinning wheel operationally configured to provide additional stability and strength to the back side of the surrey 100. In another implementation, the wheel 50 may include an in-wheel electric motor operationally configured to propel or assist in propulsion of a surrey 100 as desired. As shown in FIG. 11, the wheel 50 is suitably provided as a detachable wheel 50 that is readily received within the wheel drop outs 15 of the second section 14. Without limiting the invention to a particular embodiment, a suitable electric motor wheel 50 for use with the apparatus of FIG. 11 may include a bicycle type wheel of about 66.0 cm (about 26.0 inches) in diameter with a hub motor of about 500 watts drawing 36 volts.

In suitable operation, when the inner member 22B of the actuator 22 is resting at a point of complete retraction within the outer member 22A, the second section 14 (and wheel 50 attached thereto) are set above the travel surface 99 in a position of maximum non-engagement with the travel surface 99 (see FIG. 11). As the handle 24 is turned to extend the inner member 22B out from the outer member 22A, the second section 14, and wheel 50 attached thereto, are directed along an arc (see Arrow "A" in FIG. 1) toward a travel surface 99 until the wheel 50 contacts the travel surface 99 with a sufficient amount of force to engage the travel surface 99 and create sufficient pressure and friction to prevent the wheel 50 from slipping upon the travel surface 99 during operation. For example, in an embodiment where a propulsion wheel 50 is used, once the wheel 50 has engaged the travel surface 99 as described above the wheel 50 may be turned to an "ON" position to assist in propelling the surrey 100 across the travel surface 99. As understood by the skilled artisan, propulsion wheels 50, such as those having in-wheel electric motors, are not necessarily free spinning when turned to an "OFF" position. This is due, at least in part, to the configuration of the electric motor producing resistance as the wheel 50 turns. If such a wheel 50 is maintained in an engagement position against the travel surface 99 when turned to an "OFF" position, the wheel 50 may actually impede natural forward progress of the surrey 100 due to the resistance provided by the wheel 50. By directing the second section 14, and wheel 50 attached thereto, apart from the travel surface 99, the surrey 100 may be operated in a manner similar to a surrey 100 not equipped with an apparatus 10 and wheel 50. Thus, one advantageous feature of the prevent apparatus 10 is the ability to direct the wheel 50 toward and apart from a travel surface 99 allowing for engagement and disengagement of the wheel 50 with the travel surface 99 as desired.

Suitably, the actuator 22 is operationally configured to maintain wheel 50 in an engagement position with a travel surface 99 or disengagement position part from a travel surface 99 during operation of the apparatus 10 as desired. For example, in an embodiment where an actuator 22 is provided as a worm gear screw jack, the worm gear is maintained in a static or locked position and effective to maintain a wheel 50 in static or locked position in engagement with or apart from a travel surface 99 until the handle 24 is moved or otherwise manipulated. In addition, depending on the configuration of the apparatus 10 and its location on a target surrey 100, the apparatus 10 may also operate as a jack or lift thereby raising the rear wheels of the target surrey 100 off the travel surface 99 as the inner member 22B is extended out from the outer member 22A.

When retrofitting an existing surrey 100 with the present apparatus 10 and an electric motor wheel 50 attached thereto, other items may also be installed on the surrey 100 for effective use of the electric motor wheel 50. For example, a power source may be installed to power the wheel 50. In one simplified example where the electric motor wheel 50 is a 60-Volt/1000-Watt motor, five 12-Volt lead acid batteries wired in series may be installed on the surrey 100 for powering the wheel 50. In another simplified example, one 60 Volt, 20 to 30 amp hour lithium ion battery may be installed on the surrey 100 for powering the wheel 50. Although placement of the power source on a particular surrey 100 may vary depending on the surrey 100 construction, one suitable location of installation is beneath a surrey 100 passenger seat apart from the pedals and cranks. Another suitable location of installation is behind the back rest of the rearmost surrey seat 45. As discussed above, a power source and/or other items may be housed within a cage. A power source and/or other items may also be housed in a protective case or other container type device that may be mounted to a surrey 100 and/or an apparatus 10 in secure fashion, e.g., a protective case installed beneath a surrey 100 passenger seat apart from the pedals and cranks. Suitable protective cases may include, but are not limited to luggage piece type designs and/or toolbox type designs made from metals, plastics, fiber glass, composite materials, wood, and combinations thereof. As technology in the field of power sources progresses, it is contemplated that smaller and/or lighter power sources may be employed and installed at other locations on a surrey 100.

Other installation parts for securing to a vehicle such as a surrey 100 may include a controller or similar type device as understood by persons of ordinary skill in the field of electronics and electric vehicles, a throttle and wiring for communication between the various parts. As understood by persons of ordinary skill, a controller is hardwired to (1) the throttle, (2) the electric motor wheel 50 and (3) the power source. The controller may be installed on the surrey 100 as desired. In an embodiment using a protective case, the controller may be housed within the case along with the power source.

The throttle is suitably installed for easy access by a surrey 100 operator, which is typically an individual steering a surrey 100 during operation. As such, a suitable installation location may be on or near the surrey 100 steering wheel (or other steering mechanism if applicable). Without limiting the invention to a particular embodiment, an exemplary throttle may include, but is not necessarily limited to a twist throttle hand grip similar to a throttle that might be employed on a moped or scooter, a foot pedal, or incremental throttle similar to the throttle type employed on a golf cart or automobile. As understood by persons of ordinary skill in the art, the wiring used may include numerous insulated copper wires of different colors, gauges and lengths to connect the throttle with the controller.

In simple phraseology as understood by the skilled artisan, a controller draws electricity from a power source and directional information from a throttle and powers the electric motor wheel 50 to obey the manually operated throttle. The operator may choose to use more or less power from the power source by incremental use of the throttle based on the riding conditions and surface terrain on which the vehicle is traveling at any given moment.

The invention will be better understood with reference to the following non-limiting examples, which are illustrative only and not intended to limit the present invention to a particular embodiment.

EXAMPLE 1

Figure 12:
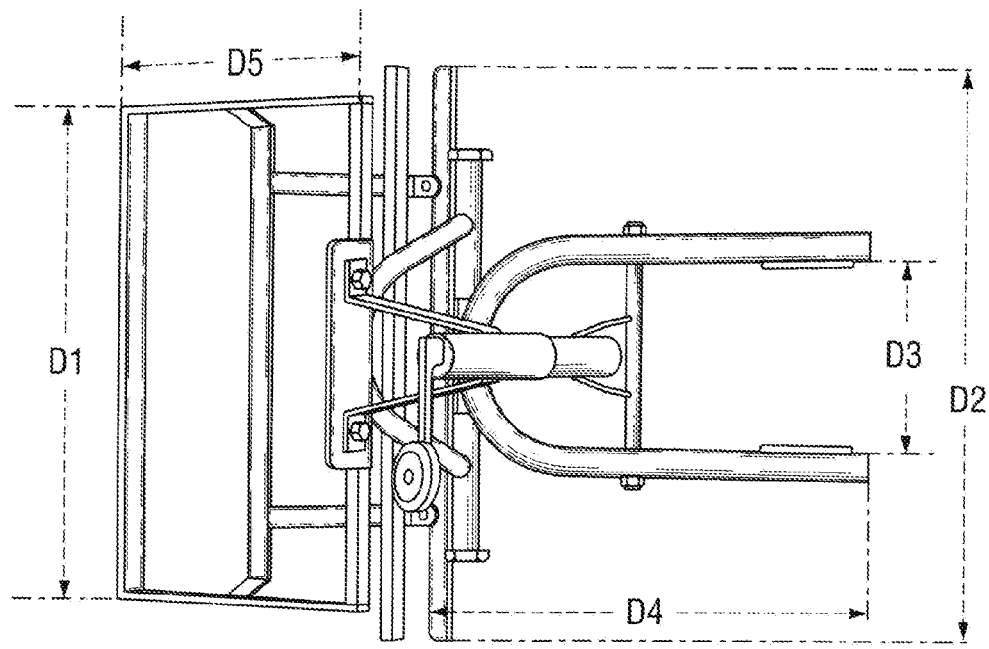
FIG. 12 is a perspective top view of the apparatus of FIG. 9.
Figure 13:
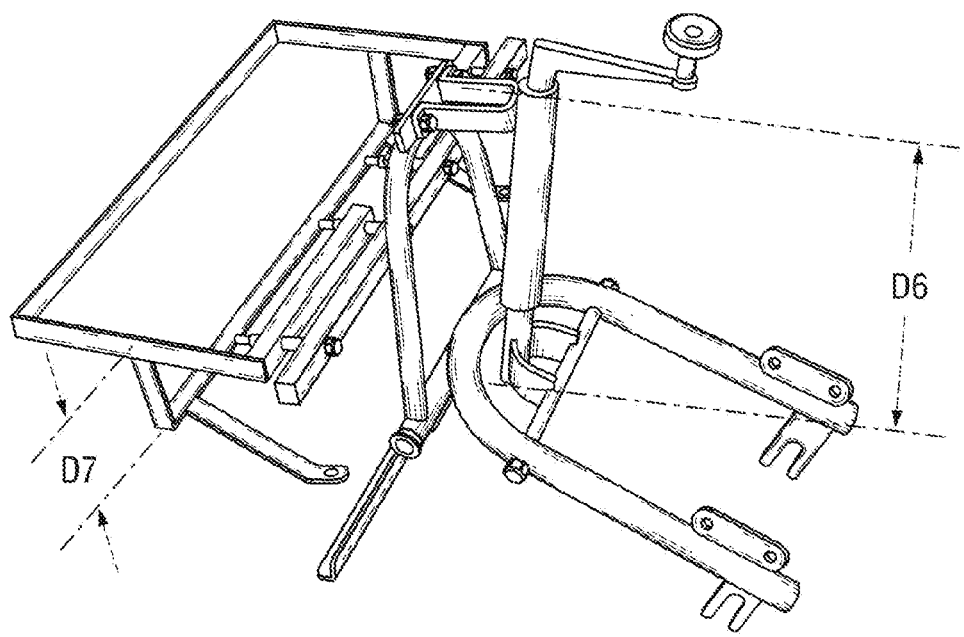
FIG. 13 is a perspective front view of the apparatus of FIG. 9.

In a first non-limiting example, an apparatus 10 as shown in FIGS. 12-13 including an actuator 22 having a worm gear and constructed from A-36 mild steel, a main frame 25 constructed from A-36 mild steel, a first attachment member 26 constructed from A-36 mild steel and a second attachment member 27 constructed from A-36 mild steel is provided having the following dimensions:

| | |
|---|---|
| D1: | about 47.32 cm (about 18.63 inches) |
| D2: | about 53.34 cm (about 21.00 inches) |
| D3: | about 20.32 cm (about 8.00 inches) |
| D4: | from about 33.66 cm to about 40.01 cm (from about 13.25 inches to about 15.75 inches)* |
| D5: | about 23.50 cm (about 9.25 inches) |
| D6: | about 35.56 cm (about 14.00 inches) |
| D7: | about 10.01 cm (about 3.94 inches). |

*The distance depends on the orientation of the second section 15 about the first pivot member 16

EXAMPLE 2

Figure 14:
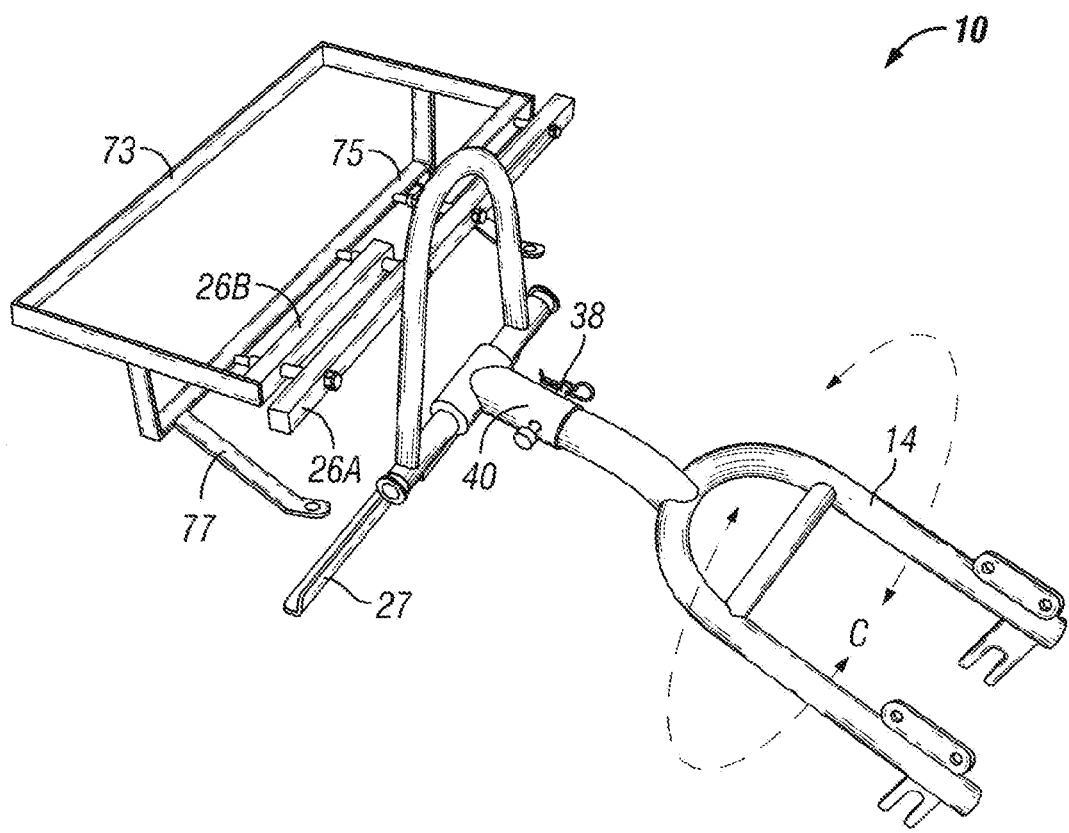
FIG. 14 is another simplified embodiment of the apparatus of this application.

In a second non-limiting example, an apparatus 10 as shown in FIG. 14 may be provided including a rotatable second section 14 operationally configured to rotate a wheel attached thereto from an engagement position with a support surface to a position of disengagement wherein the wheel may be rotated (according to Arrow "C") from a substantially vertical position to a non-vertical position.

As shown, the second section 14 may include a tubular member with one or more apertures there through that is operationally configured to mate with a female type opening 40 disposed along the main frame 25 and/or second attachment member 27 whereby the second section 14 may rotate therein and be held in an engagement or disengagement position via a pin 38 for mating with the apertures, a clamp or other locking type device as desired. In a position of disengagement, the wheel 50 may rest in a substantially horizontal position relative to the support surface.

EXAMPLE 3

In a third non-limiting example a surrey 100 is provided including an actuator, a wheel stay and pivot member are provided as part of the original surrey frame construction. The actuator 22 is fixed to the surrey 100 via an interconnect 70 and the wheel stay 14 is pivotally attached to the surrey 100 via a pivot member 16 provided along the horizontal base frame 200 of the surrey 100. The actuator 22 and wheel stay communicate in a manner as described with reference to FIGS. 9 and 10. The surrey frame, actuator 22, the wheel stay 14 and pivot member 16 are constructed from A-36 mild steel.

As will be understood by those of ordinary skill in the art, and others, many modifications may be made without departing from the spirit and scope of the invention. The embodiments described herein are meant to be illustrative only and should not be taken as limiting the invention, which is defined in the following claims.

I claim:

1. An apparatus for adding a propulsion wheel to a land based vehicle effective to move across a travel surface, when attached to the land based vehicle the apparatus is operationally configured to bias a propulsion wheel attached to the apparatus in an engagement position with the travel surface, wherein the apparatus includes a first part operationally configured to attach to the land based vehicle, a second part operationally configured to receive a propulsion wheel in attachment thereto, the second part being pivotally attached to the first part and a biasing member in communication with the second part, wherein the biasing member is a worm gear screw jack.

2. The apparatus of claim 1 wherein the apparatus is operationally configured to adjust the amount of bias applied by a propulsion wheel attached to the apparatus against the travel surface.

3. The apparatus of claim 1 wherein the second part includes a pivot axle in communication with the biasing member.

4. The apparatus of claim 1 further including a housing member operationally configured to secure a power source for the propulsion wheel to the land based vehicle.

5. An apparatus for adding a propulsion wheel to a land based vehicle effective to move across a travel surface, when attached to the land based vehicle the apparatus is operationally configured to bias a propulsion wheel attached to the apparatus in an engagement position with the travel surface, wherein the apparatus includes a first part operationally configured to attach to the land based vehicle and a second part operationally configured to receive a propulsion wheel in attachment thereto, wherein the second part is a wheel stay pivotally attached to the first part.

6. The apparatus of claim 5 wherein the apparatus is operationally configured to direct the propulsion wheel between one or more engagement positions with the travel surface and one or more disengagement positions apart from the travel surface.

7. The apparatus of claim 6 wherein the apparatus includes a biasing member in communication with the second part.

8. The apparatus of claim 7 wherein the biasing member is an actuator.

9. The apparatus of claim 8 wherein the actuator includes a shaft and a handle for rotating the shaft.

10. The apparatus of claim 7 wherein the biasing member includes an outer member and an inner member, the inner member being operationally configured to telescopically travel within the outer member.

11. A method of biasing a propulsion wheel against a travel surface of a land based vehicle, the method comprising the following steps:
   attaching to a land based vehicle an apparatus and propulsion wheel rotatably attached thereto, the apparatus having a first part operationally configured to attach to the land based vehicle, a second part in the form of a wheel stay operationally configured to receive a propulsion wheel in attachment thereto and a biasing member in communication with the wheel stay for pivoting the wheel stay about the land based vehicle in a manner effective to direct the propulsion wheel between one or more engagement positions and one or more disengagement positions with the travel surface; and
   directing the propulsion wheel to a first biased position against the travel surface.

12. The method of claim 11 wherein the propulsion wheel includes an inflatable tire.

13. The method of claim 11 wherein the propulsion wheel includes an in-wheel electric motor.

* * * * *